Patented Dec. 13, 1932

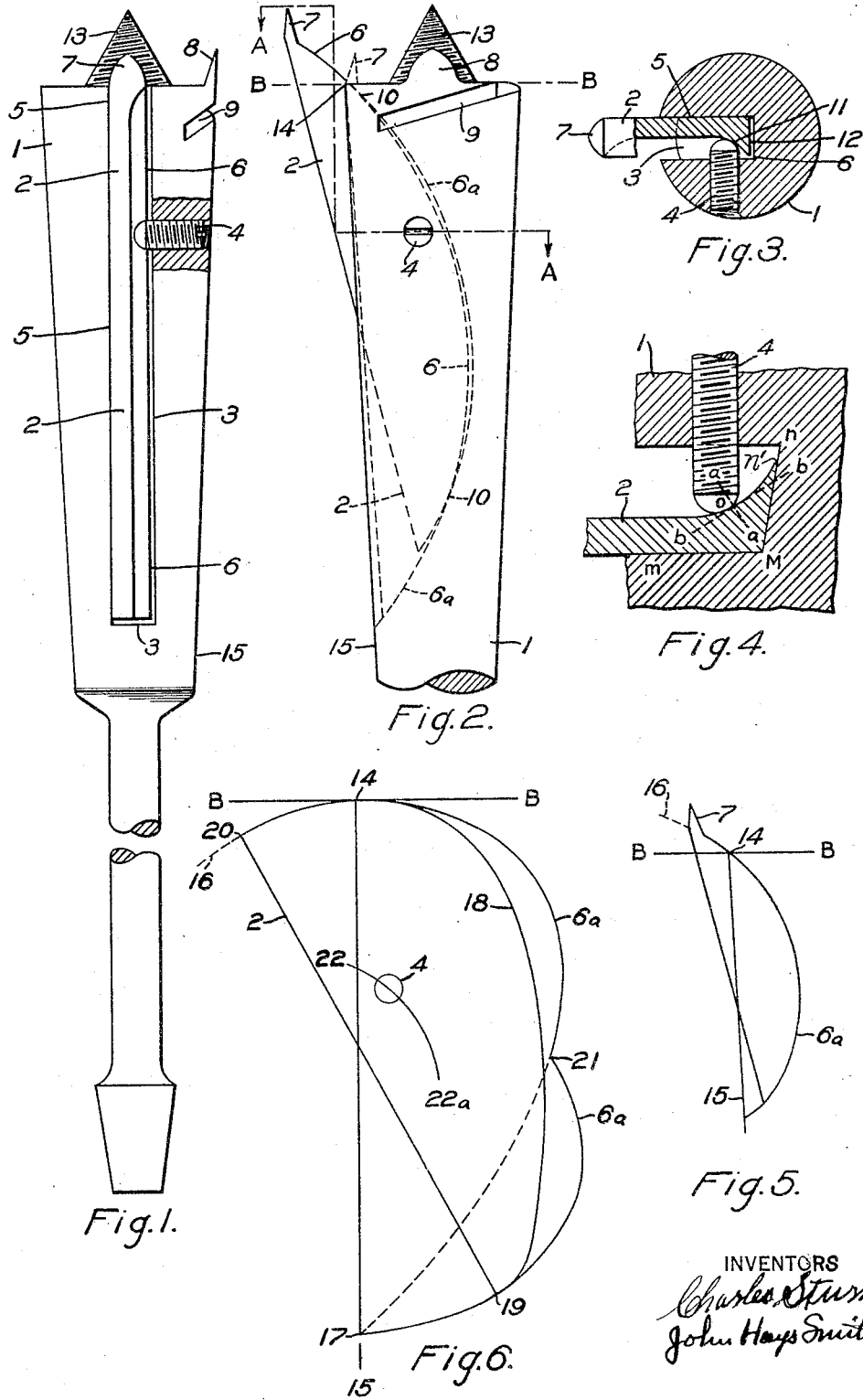

1,890,889

UNITED STATES PATENT OFFICE

CHARLES STURNI, OF PITTSBURGH, AND JOHN HAYS SMITH, OF CAMP HILL, PENNSYLVANIA

EXPANSION BIT

Application filed December 24, 1930. Serial No. 504,558.

Expansion bits heretofore have permitted adjustment of a detachable cutting member or members by a transverse movement in a single or double rectilinear slot or groove, or have utilized clumsy longitudinal extensions of limited range. In all cases that we know of, such adjustments have been straight-line movements, that is, translation occurring along plane surfaces as distinguished from curvilinear movement on curved surfaces. The clamping of the adjustable cutting member has heretofore depended on a sliding contact maintained in a single plane by a set screw, or by a wedge, being always unstable since the sliding planes can rotate or slip on each other. They depend for their fixity of position upon single plane contact. As is commonly known, their tendency is to slip with wear and use, particularly in their extreme positions. In some forms of tool, the travel of the detachable member is greatly limited, thereby requiring a set of two or more detachable members of different sizes to get a satisfactory cutting range in the boring tool.

We provide a tapered boring tool which keeps its center, bores truly round holes and has a range of cutting diameters hitherto unattained by a single, removable cutting member. By an improved locking arrangement, the extensible cutting member is interlocked with the body of the tool, at any selected diameter, so that there can be no relative movement of the parts. The interlocking feature is operable at every position throughout the entire working range of the detachable cutting member.

The wide operating range and the interlocking feature are attained by the utilization of a long, curvilinear slot within the body of the tool. The curvilinear slot may be oriented in a plurality of positions relative to the axis of the tool. In the curvilinear slot is placed a curvilinear cutting member, which may or may not have the same curvature as the slot.

The curvilinear cutting member slides in the curvilinear slot, throughout its whole length. The direction of extension and the travel of the outer point, or marker tip, being controlled by the shapes of the opposing curves—one on the body of the slot and one on the contacting face of the detachable cutting member.

In making an extension, the removable cutting member has two sliding contacts on body of tool and within said slot. One contact is in the plane defined by the side wall of the curvilinear slot and the other is a contact with the curved rear wall of the slot. Both of these sliding contacts are on surfaces nearly perpendicular to each other. One is flat and the other is curved. A slight inclination is given to the rear wall of the detachable cutting member so that in boring, it will clear itself. To this inclination, the rear wall of the slot conforms so that the full surface contact obtains, or where the opposing curvatures are not identical, at least double and parallel line contacts are maintained.

In the operating position, the detachable cutting member is interlocked between these two body surfaces, in the slot, at substantially a right angle, by means of a thrust pressure exerted by a set screw or equivalent means, so positioned as to force the bearing or contacting surfaces into intimate contact.

The detachable cutting member is provided on the face with an outer thickened cutting edge, rising by a curve into said cutting edge. The set screw engages this curved portion of the face of the cutting member at all positions. Contact is tangential to said curved face and comes on an inclined plane to exert a wedging action on said curved face, forcing the detachable cutting member into the slot, with side and rear wall contacts securely fixed. Equivalent means may be adopted.

The drawings show several embodiments of this invention.

Figure 1 is a side view of boring tool showing the curvilinear cutting member on edge and interlocked within the body of the tool.

Figure 2 shows the curvilinear cutting member in an extended position interlocked in the curvilinear slot.

Figure 3 is a cross section thereof taken along the section line A—A of Figure 2.

Figure 4 is an enlarged detail view of a portion thereof illustrating the clamping action.

Figure 5 is a kinematic view showing a slot curvature such that outward movement of the cutting member causes its end tip to rise relative to plane B—B perpendicular to axis of tool.

Figure 6 is a similar view showing a curve for depressing the end tip of the cutting member below the said plane B—B.

Figure 7:
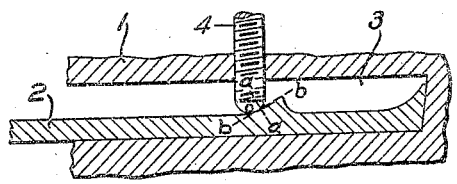
Fig. 7 is a fragmentary cross-sectional view of a modified form of the invention.

In Fig. 1, the body of the tool 1 is slotted at 3—3 and 5—5 by side walls into a rear wall more particularly defined in Fig. 2 by the curve line 6a—6a of Fig. 2 and forming a curved surface on which engages the detachable cutting member 2—2. The curvilinear cutting member is fully enclosed within the body of the tool. In shape it is much like a flat plate with two sides, one straight, though this may be also curved, and the other of a curved shape engaging the rear wall of the slot. Along the curved side of the cutting member, the plate thickens by a gradual curve into a cutting edge 6—6. In this Fig. 1, the drawing is an edge view of the detachable cutting member, showing the marker tip 7 at the front and the curved cutting edge 6—6 at the rear. At 4 the body of the tool is in partial section to show the set screw which locks on the plate cutter 2—2 at its curved side, holding it firmly against the side wall 5—5 and the rear wall of the slot 6a—6a as seen also in Fig. 2. A second marker tip is shown at 8 being a solid part of the body of the tool, though this can be detachable also, as indicated in a modification of the invention to be presently described. At 9 is shown a helical recess into the body of the tool for discharging shavings from the head of the tool. This groove begins with the usual cutting lip in the head of the tool in plane B—B, Fig. 2 and is carried around the barrel or body of the tool to a point where the manifest taper of the body will clear borings or shavings to the surface, thus obviating the usual curl or twist of ordinary boring tools. The leadscrew or worm is shown at 13.

The relation of the detachable cutting member to the tapered, conical body of the tool, is better seen in Fig. 2 in which numbers are identical with Fig. 1 for like parts. The movable member 2—2 is in an extended position showing the flat face and the curved face 6—6. In dotted outline it is also shown fully enclosed within body of the tool. To extend it, a slight pressure is exerted on it at the lower edge of the slot by the thumb, when the set-screw pressure is relaxed, making a very rapid adjustment in actual practice. The marker-tip 7 is integral with the detachable member and inclined to it as is very noticeable at 14 in the rest position.

This inclination of the marker tip is a very important feature of this invention when cutting with the detachable member in a greatly extended position.

The curvilinear plate cutter in addition to being curved along the face 6—6, rises up with a thickened portion, by a distinct curving surface into said cutting edge 6—6. This feature is shown clearly in Fig. 3 and subsequent drawings.

The detachable cutting member has therefore two distinct and separate curvatures of its surface, and both performing different functions. In a modified form there may be other curvatures of its surface as seen in Fig. 7. All of these curves are susceptible of modification and in no sense is this invention to be considered limited to curves shown in the accompanying drawings, but may include compound curves and combinations of straight lines, curves, and likewise discontinuous curves.

The points 14 and 15 clearly show the taper of body.

A section of the boring tool is shown in Fig. 3 on the plane A—A of Fig. 2. As before 1 is the body of the tool and 3 is the slot in the body. The detachable cutting member is 2, partly in section within the body of the tool, and presenting a downward view showing the marker tip 7. The set screw 4 is shown engaging the surface curvature of 2 at the point 11, interlocking the cutting member in the slot. The curved cutting edge is shown at 6, and 12 is the inclined curved rear wall of the slot being in this view a ruled surface and in full surface contact with the curvilinear face of the detachable cutting member 2. These two surfaces are shown in contact in Fig. 3, but the contacts in different design may be arranged to come at other portions of the curvilinear slot as is more clearly disclosed in Fig. 6 showing a modification of this invention.

An enlarged detail view of the interlocking feature seen in Fig. 3 is shown at Fig. 4 in which 1 is the body of the tool, 2 is detachable member and 4 is the set screw with tangential contact at 0 between the two curving surfaces, one the rounded nose of the set screw and the curved surface of the detachable cutting member. A tangent plane at $bb$ and a perpendicular $aa$ through 0 show the kinematic relation of these parts. Obviously the thrust of the set screw is along $aa$ and the resolved components of this force exert a downward pressure against the side wall $Mm$ of the slot and against the inclined rear wall $Mn$ effectively locking the detachable cutting member in the slot. When the curvature of the slot $Mn$ is a ruled surface, that is, has all elements consisting of straight lines parallel to each other, and the contacting surface of the detachable cutting member is a similar ruled surface, all elements of $Mn$ are in contact with all elements of $Mn^1$ of the detachable member. For rotation with full contact the curve must be a figure of revolution, and a similar curved surface contacting it. If the curves are dissimilar, contact will be maintained at fewer points as seen in Fig. 6.

These drawings are illustrative of the principles embodied in this invention and in no sense intended to be restricted to the particular curves of the drawings.

In motion there are two principal forces maintaining the detachable member in planar contact with side wall of slot, one the downward thrust of the set screw upon the rigid plate structure 2 and the other, the backward, and in this view, the downward thrust of the marker tip 7 and cutting edge 6, upon the same rigid member. From the relation of the parts, it will be observed that these forces are stable at all positions of the cutting member 2 and maintain rigid planar contact. Any displacement thrust of the work tending to rotate the detachable member in the plane passing through $Mm$, that is along the surface of the side wall of the slot, is opposed by surface contact in the curved surface $Mn$ as well as in $Mm$. In the surface $Mn$, there may be full contact along the whole rear wall $6a$—$6a$ in Fig. 2, or close tangential contacts at 10 and 10 as actually seen in Fig. 2.

For the double curved clamping surface of the detachable member, shown above and passing through 0, there may be substituted one having a generating element everywhere parallel to itself, contacting along straight line, $bb$, so that the rounded nose of the set screw everywhere moves the contact point 0 along a straight though inclined line, insuring uniformity of the thrust pressure at all positions. Of course there may be a combination of the straight line and a curved line for this contacting line. In other words, the curved end of the screw contacts with a straight line surface on the plate, that is a ruled surface raised up on the plate and shown in section in Fig. 7. Use of a straight line contacting element may be had where this contacting element is seen as a straight line perpendicular to the dotted line passing through 0, as in Fig. 7.

Fig. 5 is a kinematic drawing showing a pair of curves not necessarily contacting at all points. Here the slot curvature is such that outward movement of the detachable cutting member causes its end to rise above the plane B—B. The simplest set of curves would be two circles, the inner one of slightly greater diameter. They could be of equal diameters in which case the contacting is full at every point between 14 and the lowest point of the slot. The dotted curve 14—16 marks out the path of the rising point traced out by the upper tip of the detachable member. B—B is the plane referred to before, shown in Fig. 2 also, perpendicular to axis of the tool at the extreme top of the tool. The point 14 is the upper point of the slot and here shown in the plane, B—B. The height of rise of point 16 above plane B—B is diminished both by increasing the curvature of $6a$ and by inclining the whole curve to the right and so tilt the detachable member that the whole curve from 14 to 16 approaches B—B, point by point. It is evident that the curvilinear slot and the detachable cutting member may be both oriented in a plurality of positions relative to the axis of the boring tool.

Fig. 6 is a similar kinematic drawing showing curves for depressing the outward movement of the detachable cutting member, causing its tip to sink below the plane B—B. The view is of an assembly of curves for the slot and movable cutting member, which will lower the point 20 as it moves outward from the point 14.

This view is only one of a numerous group of curves that can be utilized for constraining the tip to move below the plane B—B. In using the word "curves" it is understood that it is used in a generic sense embracing the straight line also.

The rear wall of slot is defined here by a compound curve 14—$6a$—21—$6a$—19—17. The detachable cutting member is 2 with a back curving line 20—18—19. At 19 the movable member has a rounded nose which rises along the curved line 17—19 faster than the point 20 is depressed below the plane B—B. 14—16 is the path traced out by the tip of the moving member. The set screw 4 is shown with the path along which clamping is effected shown at 22—$22a$ occurring along a hump or ridge hitherto mentioned as positioned away from the cutting edge as seen in Fig. 7.

Interlocking may also be had as shown in the modification of Fig. 7, by raising on the surface of the detachable cutting member a corrugation, rib, or hump, presenting inclined surfaces either curved or straight line that engage the set screw or other clamping means.

The effect is to give a thickened portion or rib to the detachable cutting member and formed unitary with its own body, or which may be in the form of a plate attached thereto. This thickened portion, or rib or corrugation, is away from the bevelled cutting edge of the detachable member and may have any location. It is kinematically a curve itself and is not necessarily parallel to said cutting edge, nor of the same family of curves, but can be dissimilar in its curvature as clearly visible in Fig. 6.

Contact comes as before at 0 upon the tangent plane $b$—$b$ or along an inclined element of a ruled surface. This thickened portion, corrugation or rib, may be parallel to the cutting edge of the detachable member or otherwise positioned as shown in Fig. 6 at 22—22$a$. This modification is essential where the kinematic curves are not figures of revolution, and of course may be employed where it is desirable to shift the placement of the set screw or clamping means from the cutting edge of the detachable member, i. e. from the position shown in Fig. 2. Such a shift is seen in Fig. 6.

Figure 8:
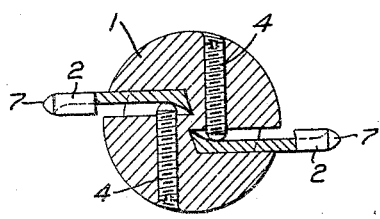
Fig. 8 is a cross-sectional view of a multiple cutter embodying a modification of the invention.

Fig. 8 shows another modification of this invention, a multiple cutter. The description hitherto presented shows a single slot and its correlative and detachable cutting member. The position of this slot as shown in the drawings, Fig. 3, is diametral, passing through the axis of tool body. By displacing the slot away from said axis, room can be made for a second slot facing on the opposite side to the first slot, and identical in dimension and curvature with the first one. By placing therein a second detachable cutting member identical in dimension with the first one, there will be provided two detachable cutters on opposite sides of the body, symmetrically placed, with this difference between them, that one is right handed and the other is left handed. Such may have the various curves hitherto discussed and disclosed in Fig. 5 and Fig. 6.

Obviously, the two detachable members can be adjusted at different distances from the center line or axis of the tool body, so that one can operate as an inside cutter, and the other work as an outside cutter defining the full diameter of the hole. Likewise the two cutters can be set at an equal distance from the axis, or the lead screw, in which case they will do the cutting work equally. Also the pair of detachable members may be of unequal shapes, separately shaped after any of the modifications herein disclosed, as well as take unequal sets from the center axis of the body of the tool.

In Fig. 8 we have seen a pair of detachable cutting members, designed to cut simultaneously and presenting one form of a multiple cutting tool.

Figure 9:
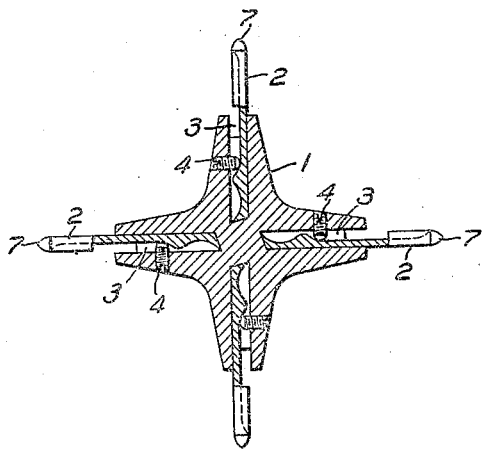
Fig. 9 is a similar view of a further modification.

Fig. 9 shows in section another modification of this invention. By the same principle one may dispose around the body of the tool, in similar or dissimilar slots, three, four or more detachable cutters, placed in symmetrical positions relative to each other. These detachable cutters need not be all in the same plane of cutting, as B—B, but one group may cut at level of B—B and a second group of detachable cutters may be disposed so as to follow after and cut at level further up on the bit, the first set entering the material to be followed by a subsequently operating group of multiple detachable cutters. The latter will cut out beyond the first group and need not necessarily be the same in number. For boring very large holes this arrangement of multiple cutters has the obvious advantage of keeping its center and permitting the applications of a large amount of power to do such work swiftly.

In Fig. 9 a further modification of this invention discloses a tool body of different section from the round one shown in Fig. 2 and Fig. 3. Here the body of the tool is changed so that a larger number of cutting members can be arranged in one group. Opposite detachable cutters can be brought into one diametral plane through axis of tool, and a similar pair is placed in diametral plane perpendicular to the first one. Here are four symmetrical cutters interlocked on plate ribs of type shown in Fig. 7. In section, the body of the tool is a rectangular cross with each arm slotted to receive its appropriate cutter. The clamping of these detachable cutters can be, either on the bevelled edge, or on a separate corrugation or rib as shown in Fig. 7. The latter arrangement permits the set screws to be moved out from the intersection of the diametral planes, making them more accessible and the rib clamping permits the modification of the round body to form a structure adapted to the multiple cutters.

Figure 10:
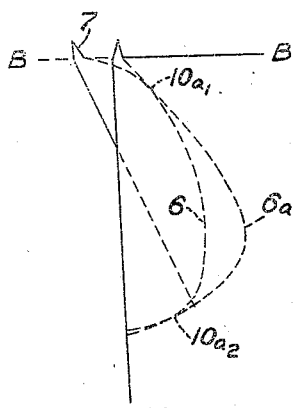
Fig. 10 and Fig. 11 are kinematic views like Fig. 5 and Fig. 6, but present different assemblies of curves.

Fig. 10 shows a group of curves in kinematic relation intended to move the marker tip approximately along a straight line. 7 rotates around the tangential sliding contact $10a$, and at the same time the whole detachable member is raised, by the ascending curve from $10a^2$ to $6a$ and compensating for the depression effected by the tip in rocking downward below plane B—B.

Figure 11:
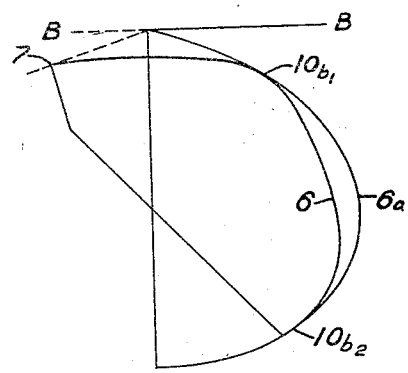

Fig. 11 shows the same elements of motion as Fig. 10, but greatly exaggerated so as to produce a downward motion of the tip 7 here shaped for cutting metal. As before rocking occurs around $10b_1$, and is only partly compensated by raising the whole detachable member along the ascending curve $10b_2$—$6a$.

A marked feature of this invention is the inclination of the marker tip of the detachable member so that in outward positions, it will be cutting more nearly in line with the axis of the tool. This is readily seen in Fig.

2 where it is bent inward from the front edge of said detachable member.

What we claim is:

1. In a boring tool the combination of a solid tapered body having a slot with a compoundly curved bottom extending substantially parallel to the axis of the tool, of a detachable cutting member having a curvilinear cutting edge and for one of its faces a curved surface engaging in the curved slot and sliding therein, and another curved surface for clamping.

2. A boring tool having a longitudinally extending slot with a compoundly curved bottom surface and a detachable cutting member having for one of its faces a compoundly curved surface for co-operation with the bottom of the slot and for another face a supporting plate engaging the side wall of said slot, in combination with a marker tip inclined to the front edge of said detachable cutting member to facilitate its cutting.

3. A boring tool comprising an extended solid body of any section whatever having radial extensions with slots having compoundly curved bottom walls for receiving detachable plate cutting members substantially enclosed therein.

4. A multiple boring tool comprising an extended solid body having radial extensions with slots having compoundly curved bottom walls and arcuate detachable plate cutting members each having for one face a compoundly curved surface for co-operation with the curved bottom walls of the slots to control the movement of the detachable and adjustable cutting members.

5. In a boring tool, the combination of a body having slots with compoundly curved rear walls adapted to receive detachable plate cutting members, with plate cutting members having for one of their faces, a compoundly curved surface engaging with the compoundly curved surface forming the rear wall of its appropriate slot and sliding therein, and means for clamping the two co-operating surfaces together in any selected position.

6. In a boring tool, the combination of a body having slots with compoundly curved rear walls adapted to receive detachable plate cutting members, with plate cutting members having for one of its faces, a compoundly curved surface engaging with and co-operating with the compoundly curved surface forming the rear wall of said slot and sliding therein, and for another face a second curved surface adjoining the first curved surface and inclined thereto, forming a cutting edge therewith and so shaped as to form a clamping surface to lock the detachable cutting member in said slot, with means for doing so.

7. In a boring tool, the combination of a body having slots with compoundly curved rear walls adapted to receive detachable plate cutting members, with plate cutting members having for one of their faces, a compoundly curved surface engaging with and co-operating with the compoundly curved surface forming the rear wall of its appropriate slot and sliding therein, and for another face a second curved surface adjoining the first curved surface and inclined thereto, forming a cutting edge therewith and so shaped as to form a clamping surface to lock the detachable cutting members in said curvilinear slots, with means for doing so.

8. In a boring tool, the combination of a body having a slot having a compoundly curved rear wall extending in the direction of the axis of the tool, with a compoundly curved plate cutting member removable from the body and having two curved surfaces, one surface furnishing a sliding contact for radially moving the detachable cutting member and a second surface of uniform curvature rising in a bevelled edge from the front face of the removable cutting member and uniting into a cutting edge with the first curved surface, with means for locking the second curved surface so that the movable cutting member is interlocked in said slot at any selected position.

9. In a boring tool having a body recessed into a slot with a compoundly curved rear wall extending in the direction of the axis of the tool and having a sliding detachable cutting member of curved form therein, the interlocking combination of a compoundly curved slot and the curvilinear plate cutting member by a set screw or equivalent means, engaging a bevelled edge of the detachable cutter so as to interlock the said cutter against the side wall and rear wall of said curvilinear slot at any selected position of said detachable cutting member.

10. In a boring tool having a body recessed into a slot with a compoundly curved rear wall extending in the direction of the axis of the tool and having a sliding detachable cutting member of curved form therein, the interlocking combination of a compoundly curved slot and the curvilinear plate cutting member by a set screw or equivalent means engaging a thickened portion of said detachable cutting member, said thickened portion being unitary with the body of the detachable cutting member and forming a cutting surface by uniting with the adjoining curved surface of the detachable member which engages the rear wall of said slot.

11. A boring tool comprising a solid tapered body having a longitudinally extending slot with a compoundly curved rear wall therein, a detachable plate cutting member substantially enclosed within said slot and having for one of its faces a curved surface engaging the curved wall of said slot, and means for clamping said detachable cutting member in said slot at any selected position throughout the entire operating range of said detachable cutting member.

12. A multiple boring tool of solid body having a group of slots, each having a compoundly curved rear wall, disposed about the axis of its body, a plurality of detachable and adjustable plate cutting members substantially enclosed within said slots, another group of curvilinear slots and adjustable plate cutting members similarly disposed about the body of the tool at another level, all the detachable cutting members having for one face a compoundly curved surface engaging a curved wall of its appropriate slot, and means for clamping each of such detachable cutting members in its respective slot at any selected positions, throughout the entire operating range of said detachable cutting members.

13. In a boring tool, a detachable cutting member with unitary and inclined marker tip, and an arcuate body portion of substantially uniform cross section on any radial plane, said body portion having for one of its faces a compoundly curved surface for co-operation with a slot in a boring tool, another face of said detachable cutting member being thickened to provide a cutting edge which merges into said body portion and an intermediate thickened portion for engagement with clamping means.

14. In a boring tool, a detachable plate cutting member with unitary and inclined marker tip, and an arcuate body portion of substantially uniform cross section on any radial plane, said body portion having for one of its faces, a compoundly curved surface for co-operation with a slot having a compoundly curved rear wall in the boring tool, another face of said detachable cutting member being thickened to provide a cutting edge which merges into said body portion and an intermediate thickened portion extending in substantial parallelism to said cutting edge for co-operating with clamping means.

15. In a boring tool, a detachable plate cutting member with unitary and inclined marker tip, and an arcuate body portion of substantially uniform cross section on any radial plane, said body portion having for one of its faces, a compoundly curved surface for co-operation with a slot having a compoundly curved rear wall in the boring tool, another face of said detachable cutting member being thickened to provide a cutting edge which merges into said body portion and an intermediate thickened portion for co-operating with clamping means, said intermediate portion extending in a definite mathematical direction relative to the cutting edge of said member so that the co-operative clamping means may engage said intermediate thickened portion throughout the entire operating range of said cutting edge.

16. A boring tool comprising a body portion having a slot extending axially of the tool the rear wall of which is given a compoundly curved shape terminating at the cutting end of said body portion, a lead screw and a marker tip extending beyond said body portion, and an arcuate plate cutting member having a compoundly curved face for engaging with the curved wall of said slot, said curved edge being gradually thickened to provide an arcuate cutting edge moveable in said slot and extensible from the lower end thereof, said cutting member terminating in a marker tip having an inclination toward the axis of said body portion whereby the marker tip on said cutting member may be projected relative to the marker tip on body portion.

17. A boring tool comprising a body portion having a slot extending axially of the tool the rear wall of which is given a compoundly curved shape terminating at the cutting end of said body portion, a lead screw and a marker tip extending beyond said body portion, and an arcuate plate cutting member having a compoundly curved face for engaging with the curved wall of said slot, said curved edge being gradually thickened to provide an arcuate cutting edge moveable in said slot and extensible from the lower end thereof, said cutting member terminating in a marker tip having an inclination toward the axis of said body portion whereby the marker tip on said cutting member may be projected relative to the marker on body portion for producing in conjunction with the inside cutting edge of the cutting member substantially an inverted frustro conical cut.

18. A boring tool having a slot in its body for directing the movement of an adjustable member, said slot being defined by a compoundly curved rear wall.

19. A multiple boring tool having a plurality of longitudinally extending slots, each slot having a compoundly curved rear wall for controlling the movement therein of an adjustable plate cutting member.

20. A cutting tool comprising a web plate having thickened cutting edge having its outer surface defined by a compound curve, one of the side faces of the tool being substantially a plain surface and the opposite side being curved to provide a re-entrance surface between the web and the cutting edge for engagement with a fastening device.

21. In a boring tool, an adjustable cutting member comprising a substantially flat plate having a curved cutting edge portion adapted to be clamped in a slot in said boring tool, the inner curved surface of said edge portion being substantially at a right angle to the plane of said plate and a sloping outer wall intermediate the main supporting portion of the plate and said edge portion for cooperation with clamping means.

22. In a boring tool, an adjustable cutting member comprising an edge portion formed as a compound curve, and a web for the edge portion extending outwardly in a plane substantially at a right angle to the edge portion and forming a coextensive support therefor.

Signed at Pittsburgh, county of Allegheny and State of Pennsylvania, this 10th day of December, 1930.

CHARLES STURNI.
JOHN HAYS SMITH.